July 8, 1924.

J. J. SATERN

BELT THROWING DEVICE

Filed Nov. 1, 1920

INVENTOR
John J. Satern
BY HIS ATTORNEY
James F. Williamson

July 8, 1924.

J. J. SATERN

BELT THROWING DEVICE

Filed Nov. 1, 1920

INVENTOR
John J. Satern
BY HIS ATTORNEY
James F. Williamson

Patented July 8, 1924.

1,500,156

UNITED STATES PATENT OFFICE.

JOHN J. SATERN, OF ROTHSAY, MINNESOTA.

BELT-THROWING DEVICE.

Application filed November 1, 1920. Serial No. 420,974.

*To all whom it may concern:*

Be it known that I, JOHN J. SATERN, a citizen of the United States, residing at Rothsay, in the county of Wilkin and State of Minnesota, have invented certain new and useful Improvements in Belt-Throwing Devices; and I do hereby declare the following to be a full, clear, and exact description of the invention, such as will enable others skilled in the art to which it appertains to make and use the same.

This invention relates to a belt throwing device. While the device is capable of being applied adjacent the belt pulley of any machine from which it is desired to throw the belt, it is particularly shown as applied to a tractor or road engine. Such machines, as is well known, are used to drive various types of farm machinery, such as threshing machines, fodder shredders, etc.

It is an object of this invention to provide a belt thrower of simple construction and one which can be quickly and easily operated when it is desired to remove the belt from the pulley.

It is another object of the invention to provide such a belt thrower, the action of which will be positive.

Another object of the invention is to provide such a belt thrower which can be readily operated from the rear of the tractor or road engine in the location where the attendant is usually stationed, so that the belt can be instantly thrown without the necessity of the attendant approaching the driving pulley or taking hold of the belt.

Other objects and advantages of the invention will become apparent as the description proceeds in connection with the accompanying drawings, in which like reference characters refer to the same parts throughout the different views, and in which, Fig. 1 is a side elevation of the device as applied to a tractor, or similar machine, which machine is shown in dotted lines;

Figure 1:
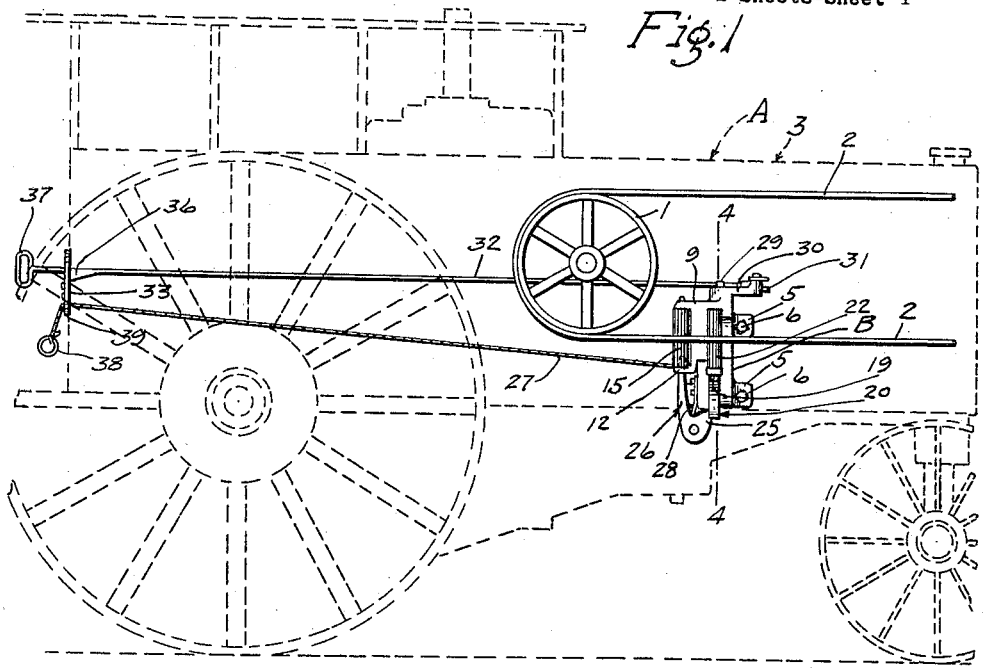
Figure 5:
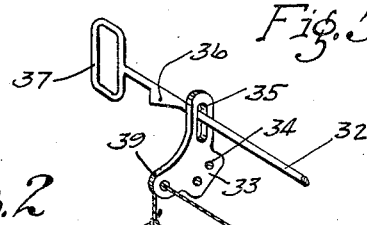
Fig. 5 is a perspective view of the bracket and ends of the operating parts carried therein.

Referring to the drawings, a tractor or similar machine to which the device is applied is diagrammatically represented by dotted lines designated as A. The driving pulley 1 carried by such a machine is shown as carrying a belt 2 which can be arranged to extend to the pulley on any desired machine. While the device can be attached to any convenient part of the machine in suitable relation to the driving pulley and belt, it is particularly shown as being attached to the side of the boiler structure 3.

The belt thrower proper comprises a bracket B having a base or attaching portion 4 suitably formed to the object to which it is to be attached and which is shown as provided with lugs 5 through which pass the securing screws or bolts 6. The bracket B also carries a lug 7 which is suitably bored to receive a pivot pin 8 rigidly secured thereto, upon which pivot pin a roller carrying member 9 is adapted to swing. This member 9 has spaced lugs 10 and 11 disposed, respectively, above and below the lug 7 and which lugs are bored to freely swing upon the pivot member 8. The member 9 also has lugs 12 and 13 projecting therefrom in the opposite direction to the lugs 10 and 11, which lugs are arranged to have securely fastened therein, a pivot pin 14 upon which the roller 15 is mounted for rotation between said lugs. The bracket B has also formed thereon, depending spaced lugs 16 and 17, in which a pivot pin 18 is rigidly secured which forms the pivot for a swinging bracket 19. This bracket, as most plainly shown in Fig. 4, carries on its lower side a projection 20, for a purpose to be later described. Near its outer end, bracket 19 has a pin 21 projecting upwardly from its top surface and a roller member 22 is rotatively mounted on this pin and held thereon by a set screw 23, or any other suitable means. Between the lugs 16 and 17 and the attaching flange 4, the bracket B also carries a pivot upon which a bell crank lever 24 is mounted. This lever is mounted to swing in a plane at right angles to the plane in which the bracket 19 moves and has a short arm or projection 25 thereon and a longer arm 26, which arm is suitably shaped at its outer end for the attachment of a cable 27 or other operating member. The lever 24 is held in the normal position shown in Fig. 1 by means of a leaf spring 28 which is attached to the side of lug 17 and bears against the short arm 25 of the lever. The bracket 19 is arranged to normally occupy the position shown in Figs. 2 and 3 and when in such position, the arm 25 is held by spring 28 in position to be engaged by the projection 20 and the bracket 19 is thus maintained in its normal position. The member 9 has a cylindrical post 29 extending upwardly from lug 10 in substantial alignment with the pivot member 8 and a crank member 30 is adapted to be firmly secured to the member 29 by a set screw or other means, the end of which crank member is rigidly secured by a fork member 31 to an operating rod 32. Disposed in some suitable location at the rear of the tractor is a bracket 33 adapted to be secured thereto by suitable screws or other fastening means extending through holes 34. The bracket 33 has a slot 35 formed therein and also has an aperture 39 extending therethrough. The rod 32 is extended to project through the slot 35 and carries a latch member 36 adjacent to a suitable handle 37. The cable or flexible member 27 is passed through the aperture 36 and has an operating ring 38 attached to the end thereof.

Figure 2:
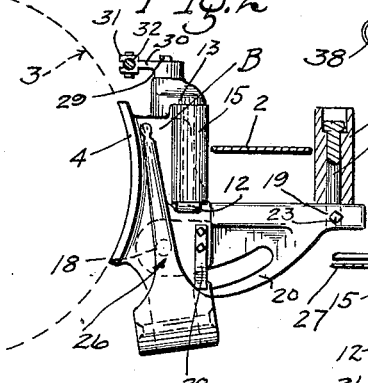
Fig. 2 is a view of the device in elevation as viewed from the left in Fig. 1, some parts being in section.
Figure 3:
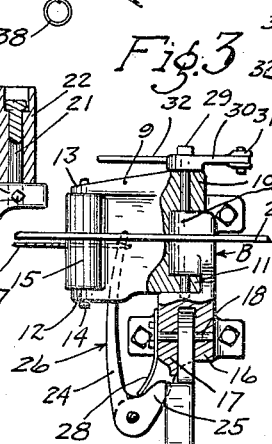
Fig. 3 is also a view in side elevation of the device, parts thereof being shown in section.
Figure 4:
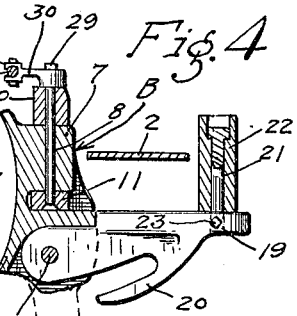
Fig. 4 is a sectional view taken on the line 4—4 of Fig. 1, looking in the direction of the arrows.
Figure 6:
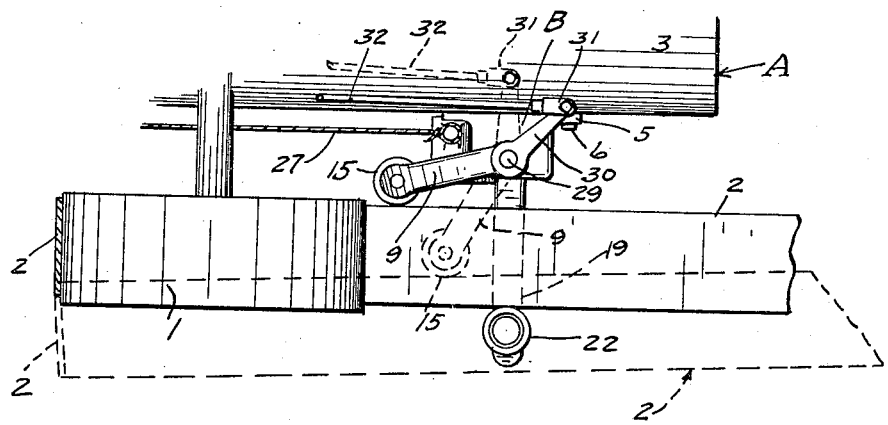
Fig. 6 is a plan view of the device.

A driving belt which is shown in section in Figs. 2 and 4, is normally held in position and prevented from moving off the pulley by the roller member 22. When it is desired to throw the belt off of the pulley, the cable 27 is pulled by means of ring 38 and the lever 24 is swung to the left, as seen in Figs. 1 and 3 and a projection for arm 25 is moved out of alignment with the projection 20 of bracket 19. The support being removed from this bracket it drops to position illustrated in Fig. 3. The rod 32 which has normally been held in position by engagement of the latch 36, with the side of the slot 35 toward the pulley, is now depressed and the catch and rod pulled through the slot 35 toward the rear of the tractor. The member 9 is thus swung on its pivot and the roller 15 carried thereby pushes against the side of the belt and throws the same from the pulley. In Fig. 6, the member 9 and roller 15 are shown as having swung on its pivot and moved to the dotted line position, and as having pushed the belt to the position shown in dotted lines. The belt can be replaced on the pulley by hand, when desired, and the bracket 19 again lifted to its normal position in which it will be held by the swinging of the arm 26 back of projection 20.

From the above description, it will be seen that applicant has produced a simple and efficient belt thrower and one by means of which the belt can be quickly thrown by a person standing at the rear of the machine. The device has a high degree of utility as it is often necessary to throw the belt from the driving pulley very quickly to stop the driven machine in case of accident, breakage, or for some operating reason.

It will, of course, be understood that various changes in the form and details of the parts can be made without departing from the scope of applicant's invention which, briefly stated, consists in the matter shown and described and set forth in the appended claims.

What is claimed is:

1. The combination with a tractor, and the driving pulley thereon, of a belt thrower located adjacent the lower side of the driving pulley comprising a bracket, a swinging means thereon for holding the belt on the pulley, a pivoted bell crank lever, a spring carried by the bracket normally holding said lever in position to engage and retain the swinging means in its normal position, an operating member connected to said lever for moving it to permit said swinging means to move from normal position, a pivoted lever having a roller thereon contacting the belt, and an operating means connected to said lever for swinging the same to push the belt from the pulley.

2. The combination with a driving pulley, of a belt thrower located adjacent said pulley and the bottom run of the belt passing over said pulley, comprising a fixed bracket, a pivoted bracket extending therefrom having a roller mounted thereon to retain the belt on the pulley, said bracket having a projection thereon, a bell crank lever pivoted on the fixed bracket to swing in a plane substantially at right angles to said first mentioned bracket and having one arm arranged to engage with the projection on said pivoted bracket to hold the same in normal position and also having an operating arm, a spring for holding said bell crank lever in normal position, operating means connecting to the operating arm of the lever, a pivoted lever carrying a roller for contacting the edge of the belt, and operating means connected to said lever to swing the same to throw the belt from the pulley.

3. The combination with a tractor and a driving pulley located at the side thereof, of a belt throwing device disposed adjacent to the lower run of the belt on said pulley, a fixed bracket secured to the side of said tractor, swinging means for holding the belt in position on the pulley, tripping means for normally holding said swinging means in normal position, an operating member for said tripping means extending to and supported at the rear portion of the tractor, a pivoted lever having roller means thereon for contacting the edge of the belt, and operating means connected to said lever and also extending to and supported at the rear of the tractor whereby the first mentioned operating means may be actuated to trip said swinging means and the second mentioned operating means can then be actuated to throw the belt from said pulley.

4. The combination with a tractor and a driving pulley thereon, of a belt throwing device located adjacent said pulley and the lower run of the belt thereon, comprising a bracket secured to said tractor, swinging means on said bracket for holding said belt on said pulley, tripping means for normally holding said swinging means in position, an operating means for said tripping means extending to the rear of the tractor, a pivoted lever carrying means contacting with the belt to throw the same from the pulley, an operating means connected to said lever and also extending to the rear of the tractor, means supporting both of said operating means at the rear of the tractor, a latch for holding said lever in normal position with the belt on the pulley and a spring for holding said tripping means in normal position.

In testimony whereof I affix my signature in presence of two witnesses.

JOHN J. SATERN.

Witnesses:
 SYRUM BOGLIEN,
 OSCAR SWENSON.